Feb. 4, 1930.  C. N. GOODWIN  1,745,925
COTTON HARVESTER
Filed May 6, 1922   2 Sheets-Sheet 1
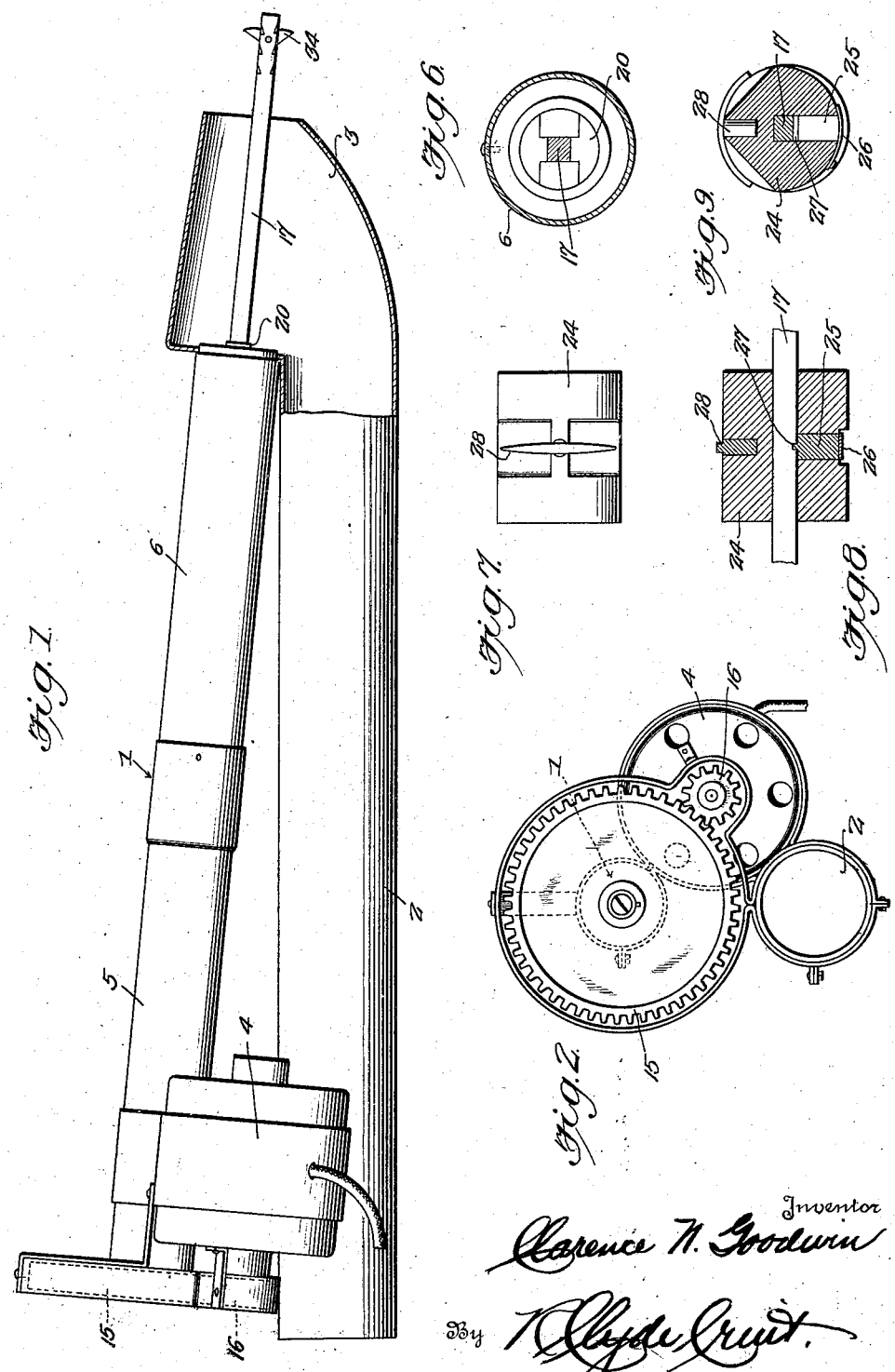

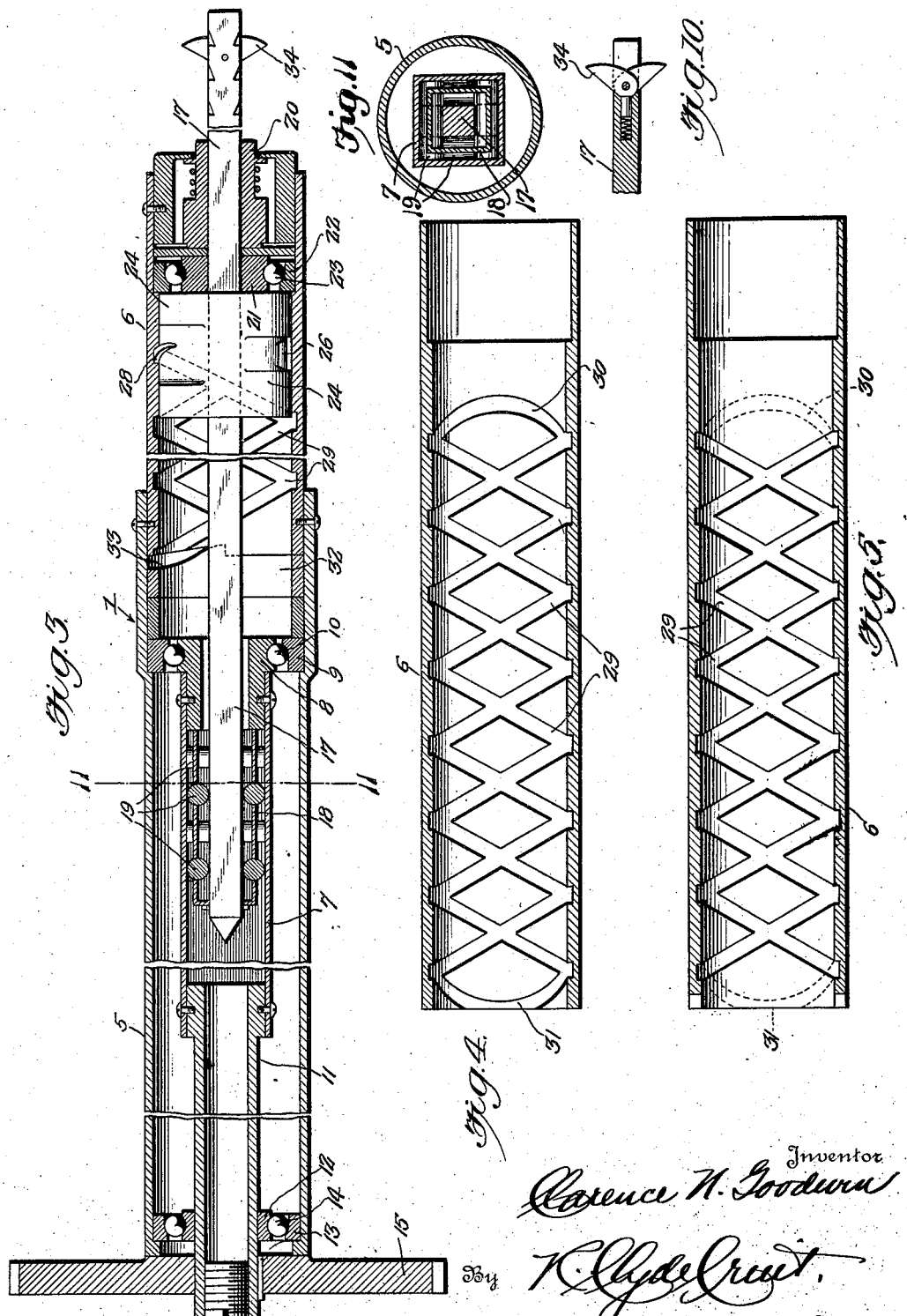

Patented Feb. 4, 1930

1,745,925

UNITED STATES PATENT OFFICE

CLARENCE N. GOODWIN, OF RALEIGH, NORTH CAROLINA

COTTON HARVESTER

Application filed May 6, 1922. Serial No. 558,894.

This invention relates to cotton harvesters, and particularly to certain improvements in the construction and operation of the picker needle of either the hand or automatically directed, combined, pneumatic and mechanically operated type, wherein said picker needle is continuously and simultaneously rotated and reciprocated.

One of the primary objects of the invention is to provide a mechanism for this form of picker, wherein the continuous rotary motion of the needle, by reason of certain improved cooperating parts will also cause the continuous reciprocating motion of said needle, the rotary motion being preferably performed by a motor mounted on the housing for the picker needle.

Another object of the invention is the provision of means for automatically releasing the picker needle temporarily from its mechanism, in the event that said needle should strike an obstruction during the operation thereof, and thus prevent the injuring or breaking of the needle.

Another object is to provide anti-frictional bearings for the cooperating parts, with respect to both the rotating and reciprocating members and especially between the inner end of the needle and the telescoping connection permitting the reciprocating movement of said needle, which latter operation will be hereinafter more fully described.

It is to be further understood that an air suction nozzle and conduit is associated with said picker needle, whereby the cotton, as it is stripped from the needle is conveyed to the desired place of collection.

Briefly stated the invention comprises a tubular housing or barrel in which the picker needle is mounted on anti-frictional bearings for combined rotary and reciprocating movements, one end of said barrel being provided with a cotton stripping element, centering the outer end of the needle, and the other end having projecting therefrom a rotary spindle or extension to which is secured a gear or the like meshing with a pinion carried preferably by the shaft of an electric motor mounted adjacent thereto, whereby the necessary rotation of the spindle is accomplished.

The inner part of the spindle enclosed within the tubular housing is secured to an elongated hollow member, square in cross section, in which the inner end of the picker needle is adapted to telescope, the particular connection and cooperation of these parts being such that the needle will not only be caused to rotate therewith but will also be permitted to reciprocate within said member, a novel form of anti-frictional device being interposed between the working parts.

Detachably keyed to the intermediate portion of the picker needle, between the stripper and said telescopic connection, is a follower or the like, provided with means on its outer periphery in engagement with a continuous intersecting spiral groove formed in the inner periphery of the barrel or casing, whereby upon the rotation of the picker needle the follower will be caused to traverse said spiral groove, back and forth, causing the desired reciprocatory movements of said needle simultaneously with the rotation thereof.

The preferred embodiment of the invention is illustrated in the accompanying drawings in which:

Fig. 1 is a view partly in elevation and partly in section of the completely assembled device, and Fig. 2 is a rear end view thereof.

Fig. 3 is a sectional view partly broken away illustrating the interior mechanism of the picker.

Fig. 4 is a half sectional view of the continuous intersecting spiral groove for causing the reciprocatory movement of the picker needle, and Fig. 5 is the opposite half view thereof.

Fig. 6 is a right hand end view, partly in section, of Fig. 3.

Fig. 7 is a top plan view of the follower and groove engaging means.

Fig. 8 is a longitudinal vertical sectional view of the follower showing the means for detachably securing the same to the needle, and Fig. 9 is a vertical transverse sectional view of the follower and needle.

Fig. 10 is a detail view of the outer end of the picker needle showing the means of mounting the prongs or tangs.

Figure 11 is a sectional view on lines 11—11 of Fig. 3.

Referring to the drawings in detail, 1 represents a barrel or housing for the picker mechanism having associated therewith an air suction conduit 2, said conduit terminating in a nozzle or chamber 3 surrounding the outer end of the picker needle. Secured to the inner end of the housing or barrel 1 is an electric motor 4 for furnishing the desired power for operating the picker mechanism, in a manner to be hereinafter more fully described.

The barrel or housing 1 preferably comprises two separable sections 5 and 6, the necessary means being provided to secure these sections together in the manner as shown.

Mounted within the section 5 is an elongated hollow member 7, square in cross section, the inner end thereof being secured to a rotary bearing member 8 cooperating with an annular member 9 secured within the section 5, the members 8 and 9 being so disposed as to provide a raceway for a series of balls 10. The outer end of the hollow elongated member 7 is connected to a hollow spindle or the like 11, said spindle being provided with a bearing member 12, cooperating with a cone 13, having mounted therebetween a series of balls 14 in a manner similar to the ball bearing construction just described, with respect to the inner end of the elongated member 7. The spindle 11 extends out beyond the adjacent end of the section 5 of the housing and has secured thereto a gear wheel or the like 15 adapted to mesh with a pinion 16 carried by the shaft of the electric motor 4 whereby the desired rotation of the spindle 11 carrying the square elongated member 7 is accomplished.

Adapted to telescope within the hollow member 7 is a picker needle 17. Interposed between that end of the picker needle and the hollow member 7 is a cage or housing 18 having mounted therein a series of horizontally and vertically disposed roller bearings 19, whereby the picker needle will be anti-frictionally mounted for reciprocatory motion within the member 7 and at the same time be caused to rotate upon the rotation of said member 7. The picker needle 17 extends through a cotton stripping device 20 secured in the outer end of the section 6 of the housing 1. This needle is square and upon the rotation thereof carries with it the stripper 20, the opening through the stripper 20 being also squared to correspond to the shape of the picker needle. Immediately back of the stripper 20, and surrounding the picker needle 17, is a bearing member 21 cooperating with a cone 22 secured within the inner periphery of the section 6 adjacent thereto, and interposed between the bearing member 21 and the cone 22 is a series of balls 23 providing an anti-frictional rotary bearing for the picker needle 17 at the outer end of section 6. Secured to the intermediate portion of the picker needle 17, between the stripper 20 and the telescoping connection, is a follower or the like 24, said follower being provided with a movable pin or key 25, normally held in operative position by a leaf spring 26, the inner end of said pin 25 being adapted to engage a transverse slot or groove 27 formed in one side of the picker needle 17, all of which is clearly shown in Fig. 8. The opposite side of the follower 24 is provided with an oppositely tapered or pointed member 28 for engagement with a continuous intersecting spiral groove 29 formed around the inner periphery of section 6 of the housing so that upon the rotation of the picker needle 17 the member 28 will follow the groove 29 from end to end and return, whereby the necessary reciprocatory motion of the needle will be caused simultaneously with the rotation thereof. As shown in Fig. 4 the ends of the grooves are connected as at 30. It is, of course, to be understood that both ends of the intersecting grooves are to be made continuous, but as shown at 31, a portion of the connecting groove at this end has to be left open in order to insert the follower 24, when the device is assembled. To complete this groove, after the follower has been inserted, a separate annular member 32 is inserted adjacent this end of section 6 as clearly shown in Fig. 3. This member 32 is provided with a curved portion 33, following the general curvature of the connecting groove 31, so that when these parts are assembled the proper functioning and cooperation of the groove and follower may be had.

The outer end of the picker needle is preferably provided with a pair of similar, centrifugally and spring controlled prongs or tangs 34, shown more clearly in detail in Fig. 10 of the drawings.

From the foregoing description it is believed that the operation and functioning of the various parts will be perfectly obvious. The necessary source of electrical current being applied to the motor 4, the gear wheel 15, carrying the spindle 11, will be rotated as will also the elongated hollow square member 7 carried by said spindle 11, these parts being anti-frictionally mounted for this rotary motion, as hereinbefore described and clearly shown in Fig. 3. As these parts rotate they also carry with them the square picker needle 17, which needle is substantially keyed within the elongated hollow member 7 by the cage 18 supporting roller bearings 19. As the picker needle 17 is rotated, the follower 24, being keyed thereto, is likewise rotated, causing the member 28 thereof to traverse the continuous intersection groove 29 formed on the inner periphery of section 6 of the housing. By reason of the connecting grooves 30 and 31, as the follower reaches the ends of the grooves, the same will be caused to return in the opposite direction in an obvious manner, and thus causing the reciprocating of the picker needle 17, this reciprocatory motion being permitted by the anti-frictional telescoping connection of said needle with the elongated hollow member 7. By reason of this peculiar telescoping connection the picker needle will be caused to rotate upon the rotation of the spindle 11 and at the same time said needle will be permitted to reciprocate, said reciprocatory motion being caused by the cooperation of the follower and continuous intersecting grooves, dependent, of course, upon the rotary motion of the picker needle.

By the foregoing construction all the various working parts of the picker mechanism are anti-frictionally mounted and by certain novel construction and cooperation of the various parts of the device the picker needle is continuously and simultaneously rotated and reciprocated, said reciprocatory motion being caused by the continuous rotary motion thereof.

What I claim is:

1. In a cotton harvesting device, the combination with a picker needle, of a housing for said needle spaced therefrom, means for rotating the needle and cooperating means contained within the housing and interposed between said needle and housing and concentric therewith, for causing simultaneously with the rotation of the needle, a continuous reciprocatory movement thereof.

2. In a cotton harvesting device, the combination with a picker needle and a housing for the needle spaced therefrom, of means concentric of the needle and interposed between the needle and housing for rotating the needle and means also concentric of the needle for causing simultaneously a reciprocation thereof upon the rotation of said needle.

3. In a cotton harvesting device, the combination with a picker needle, of a housing for said needle spaced therefrom, a rotary member carried by said housing, means interposed between the housing and needle for reciprocating said needle and anti-frictional means telescopically connecting said needle with the rotary member.

4. In a cotton picker, the combination with a substantially hollow rotary member square in cross section, of a reciprocated picker needle member telescoping within said rotary member, a square housing slidably mounted on the telescoping portion of said reciprocated member and adapted to fit within the hollow rotary member, and roller bearings carried by the four sides of said housing interposed between the reciprocated and hollow rotary members.

5. In a cotton harvesting device, the combination with a picker needle, of a housing for said needle, an elongated hollow member, angular in cross section, also mounted within said housing, means for rotating said hollow member, antifrictional telescoping connection between said elongated hollow member and needle, and cooperating means carried by said needle and housing for causing the reciprocating of said needle upon the rotation of the needle and simultaneously therewith.

6. In a cotton harvesting device, the combination with a picker needle, of a housing for said needle provided with a continuous intersecting spiral groove formed around the inner periphery of said housing, an elongated hollow member, angular in cross section, also mounted within said housing, means for rotating said hollow member, antifrictional telescoping connection between said elongated hollow member and needle, a follower carried by said needle, and means on said follower for engaging the aforesaid spiral groove for causing the reciprocating of said needle upon the rotation of said needle and simultaneously therewith.

7. In a cotton harvesting device, the combination with a picker needle, of a housing for said needle provided with a continuous intersecting spiral groove formed around the periphery of said housing, an elongated hollow member angular in cross section also monuted within said housing, a spindle secured to the outer end of said hollow member extending without said housing, means carried by said spindle for rotating said hollow member, a telescoping antifrictional roller bearing connection between the hollow member and needle, a follower carried by said needle, and means on said follower for engaging the aforesaid spiral groove for causing the reciprocating of said needle upon the rotation of said needle and simultaneously therewith.

8. In a cotton harvesting device, the combination with a picker needle, of a housing for said needle provided with a continuous intersecting spiral groove formed around the inner periphery of said housing, an elongated hollow member angular in cross section also mounted within said housing, a spindle secured to the outer end of said hollow member extending without said housing, means carried by said spindle for rotating said hollow member, a telescoping antifrictional roller bearing connection between the hollow member and needle, a follower detachably carried by said needle to permit the disengagement thereof under abnormal pressure, and means on said follower for engaging the aforesaid spiral groove for causing the reciprocating of said needle upon the rotation of the needle and simultaneously therewith.

9. In a cotton harvesting device, the combination with a picker needle, of a housing for said needle, means for simultaneously rotating and reciprocating said needle, combined centrifugally and spring controlled tangs carried by the outer end of said needle for engaging the cotton bolls upon the projecting of said needle, and a stripper cooperating with said needle to contract said prongs and remove the picked cotton therefrom upon the retraction of said needle 10. In a cotton harvesting device, the combination with a picker needle, of a housing for said needle provided with a continuous intersecting spiral groove formed around the inner periphery of said housing, an elongated hollow member angular in cross section also mounted within said housing, a spindle secured to the outer end of said hollow member extending without said housing, means carried by said spindle for rotating said hollow member, a telescoping anti-frictional roller bearing connection between the hollow member and needle, anti-frictional bearings between the rotary parts and said housing, a follower detachably carried by said needle, means on said follower for engaging the aforesaid spiral groove for causing the reciprocating of said needle upon the rotation of the needle and simultaneously therewith, combined centrifugally and spring controlled prongs or tangs carried by the outer end of the needle for engaging the cotton bolls upon the projecting of said needle, a stripper cooperating with the needle to contract said prongs and remove the picked cotton therefrom upon the retraction of the needle, and an air suction nozzle and conduit associated with said picker mechanism.

In testimony whereof I affix my signature.

CLARENCE N. GOODWIN.